No. 790,784. PATENTED MAY 23, 1905.
A. J. COLLINS.
DUST BLOWER AND SPRAYER.
APPLICATION FILED NOV. 15, 1904.
2 SHEETS—SHEET 2.
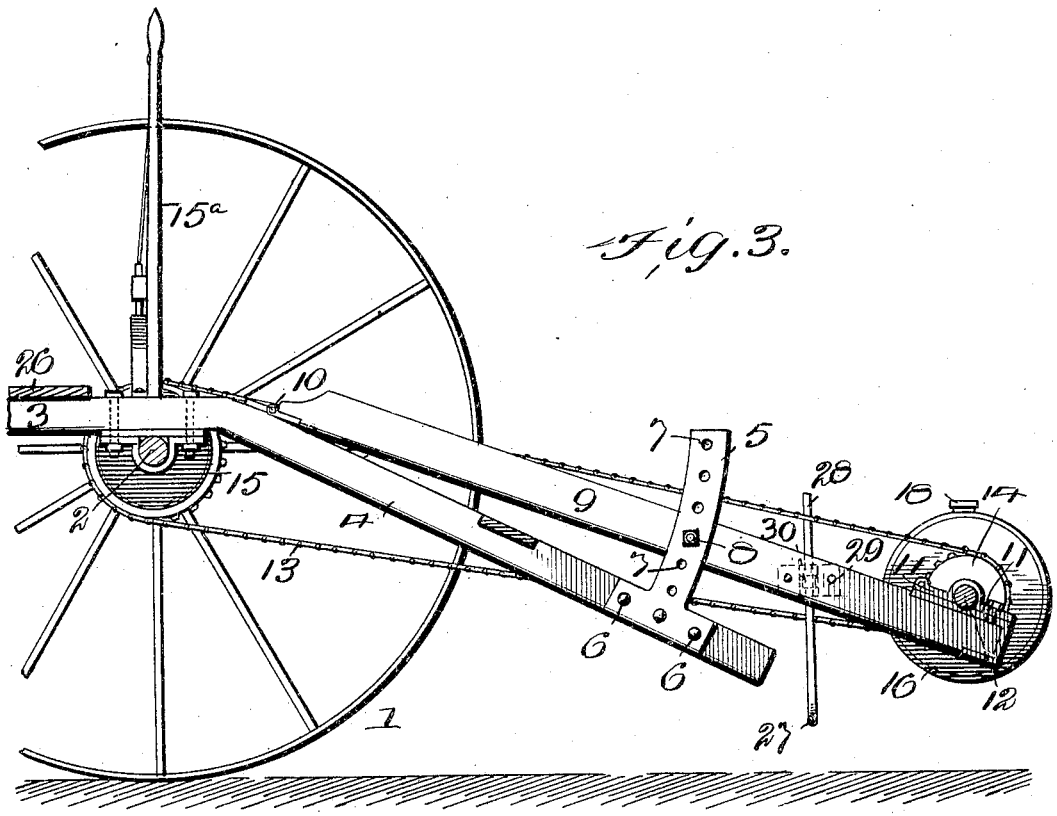
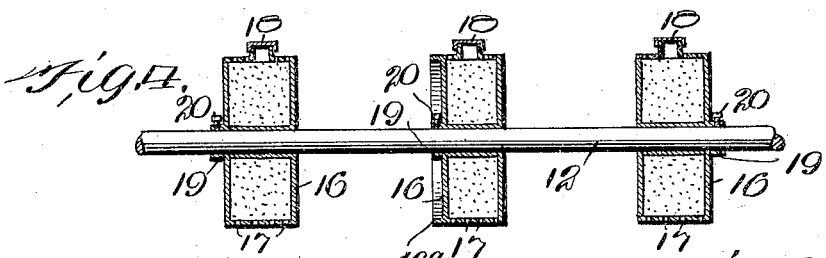
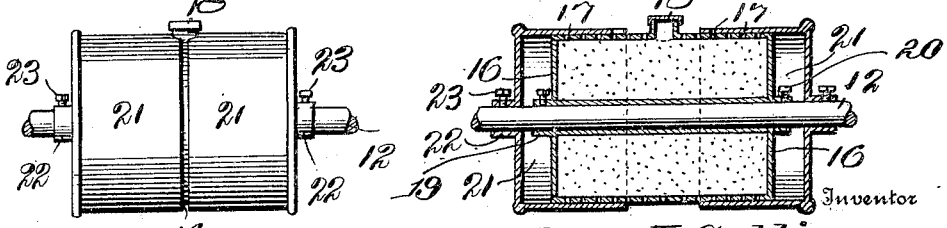
Witnesses
Inventor
Arthur J. Collins
By
Attorneys No. 790,784. Patented May 23, 1905.

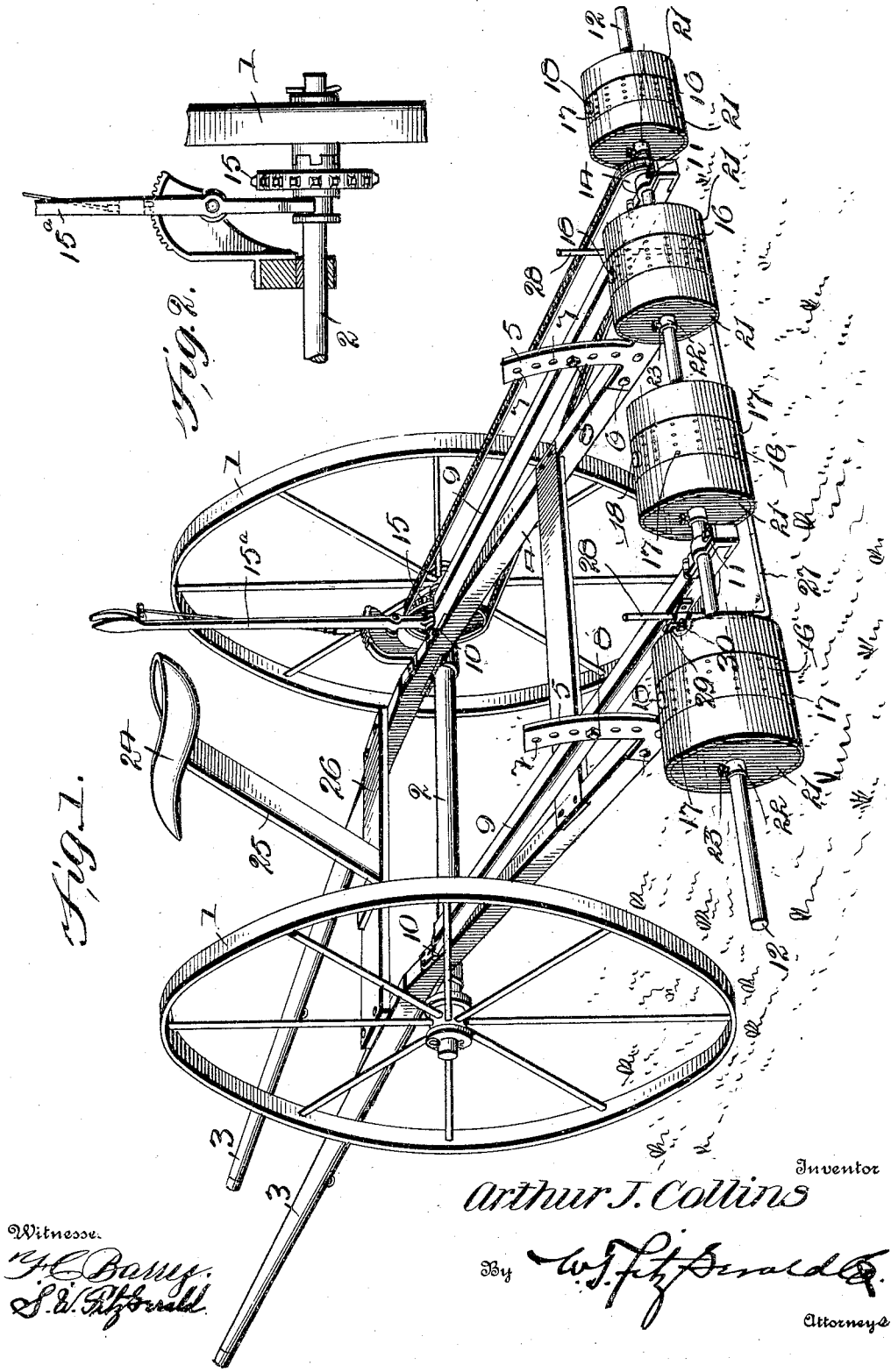

UNITED STATES PATENT OFFICE.

ARTHUR J. COLLINS, OF MOORESTOWN, NEW JERSEY.

DUST BLOWER AND SPRAYER.

SPECIFICATION forming part of Letters Patent No. 790,784, dated May 23, 1905.

Application filed November 15, 1904. Serial No. 232,874.

*To all whom it may concern:*

Be it known that I, ARTHUR J. COLLINS, a citizen of the United States, residing at Moorestown, in the county of Burlington and State of New Jersey, have invented certain new and useful Improvements in Dust Blowers and Sprayers; and I do hereby declare the following to be a full, clear, and exact description of the invention, such as will enable others skilled in the art to which it appertains to make and use the same.

My invention relates to machines for distributing insecticides and fungicide in the form of powders or dust directly upon the growing plants and in the exact or required quantities to insure the best results; and my invention consists of certain novel features of combination and construction of parts the preferred form whereof will be hereinafter clearly set forth, and pointed out in the claims.

The prime object of my invention, among others, is to provide means for delivering directly upon the growing plants, vines, &c., such quantity of insecticide and fungicide destroying powder or dust as has been found by experience to be sufficient to destroy harmful insects and fungus diseases without resultant injury to the plants.

A further object of my invention is to provide simple though reliably-efficient mechanism whereby a maximum area or surface of ground may be covered at the expense of a minimum amount of labor.

Other objects and advantages will be hereinafter made clearly apparent, reference being had to the accompanying drawings, which are made a part of this application, and in which—

Figure 1 is a perspective view of the complete machine. Fig. 2 is a detail view showing a portion of the clutch mechanism. Fig. 3 is a side elevation of my machine, showing part thereof in section. Fig. 4 is a detail view showing dust-receptacles adjusted upon the carrying-shaft provided therefor. Fig. 5 shows a cover for my dust-receptacle, which will prevent the powder from passing out of the receptacle proper, while Fig. 6 shows a longitudinal central section of the dust-receptacle shown in Fig. 5 with the covers partly removed.

In order to conveniently refer to the various parts of my invention and coöperating accessories, numerals will be employed, the same numeral applying to a similar part throughout the several views, and, referring to the numerals on the drawings, 1 designates suitable carrying-wheels mounted upon the supporting-axle 2, to which are connected in the usual or any preferred manner the shafts 3, the rear ends of said shafts being extended, as designated by the numeral 4, to provide accommodation for the mounting of the shaft 12 in the manner hereinafter explained—that is to say, the shaft extensions 4 are provided near their rear ends with the standards 5, attached thereto in any preferred way, as by the bolts 6, said standards having a plurality of apertures 7, through any one of which may be extended the adjusting-bolt 8, carried by the members 9, the forward ends of which are connected, as by the hinges 10, to the extensions 4, as clearly shown in Figs. 1 and 3.

Suitable bearing-seats 11 are provided in the rear end of the members 9, and in said bearing-seats I rotatably mount the shaft 12, which is rotated by the sprocket-chain 13, or equivalent thereof, extending around the sprocket-wheels 14 and 15, the former being keyed rigidly to the shaft 12, while the latter coöperates with the inner end of the hub of one of the carrying-wheels 1. The inner end of the hub and the outer side of the wheel 15 are provided with coöperating clutch-faces, and as the wheel 15 may be moved inward or outward by means of the controlling-lever 15ª it follows that the wheel 15 may be left wholly idle upon the axle 2 or caused to rotate with the carrying-wheel, as desired. It is therefore obvious that when the carrying-wheels are drawn over the ground the sprocket-wheel 15 will be rotated and incidentally insure the rotation of the sprocket-wheel 14 and the shaft 12.

It will be understood that I reserve the right to employ any other form of power-shifting mechanism than that just described, inasmuch as the substantial equivalent thereof is comprehended by me in this application—that is to say, the shifting device may be located so as to coöperate with the sprocket-wheel 14 upon the shaft 12, and the shifting device may be of any preferred character similar to that controlled by the lever 15 or may be wholly different therefrom, as may be deemed most desirable. In order to utilize the rotation of said shaft, I secure thereon one or more preferably cylindrical compartments 16, each provided upon its peripheral face with a plurality of perforations, (designated by the numeral 17,) and since the compartments 16 are designed to be partly filled with fungicide and insect-destroying powder of any preferred variety introduced through the openings 18 it follows that when the said compartments are rotated the requisite quantity of the powder will be caused to pass through the perforations and fall directly upon the rows of growing plants as the appliance is drawn through the field.

It will be understood that the location of the several dust-distributing compartments 16 upon the shaft 12 will be determined by the position of the rows of growing plants to be treated by the insect-destroying powder, it being understood that each of the compartments 16 is provided with a suitable flange or collar 19, fitting around the shaft 12, whereby said collar may be locked in position relative to the shaft by means of the set-screw 20 or equivalent device. As shown in Fig. 4, the compartments can be arranged in groups. With such an arrangement the central member of each group is provided with a flange 16ª, which surrounds the collar 19 of said member. By providing this flange the several compartments or members of the group can be placed end to end.

It will be understood that the size of the compartments may be varied according to the nature of the work and in accordance with the desired dust-holding capacity, and since it is desirable to treat several rows of growing plants I am enabled to accomplish this by providing the requisite length for the shaft 12 and properly adjusting thereon the several dust-carrying compartments.

It sometimes becomes desirable to close the several perforations, and thereby prevent the escape of the powder, as when drawing the machine from one field to another, and it is furthermore desirable to adjust or regulate the amount of dust discharged from the several receptacles or to increase or diminish the width of the stream of falling dust, and with this end in view I provide the adjustable closures 21, each having a flange or collar 22 to fit around the shaft 12 and a set-screw 23 to secure the same in an adjusted position. The outer ends of the closures 21 are inclosed, while the inner ends thereof are left open to be entered over the ends of the receptacle 16, and it follows that by properly adjusting the closures 21, by means of said set-screws 23, the width of the path covered by the dust may be easily regulated. If, for instance, it is desired to permit only a small quantity of dust to be delivered directly in the center of the row of growing plants, the closures 21 may be brought almost together, which will leave exposed only the middle portion of the peripheral face of the receptacle 16, and thus insure that the remaining portion of the perforations shall be covered, and thereby prevent the contents from escaping. I desire also to call attention to the member 27, consisting of a light wooden or metal rod having the upwardly-extending branches 28, which pass through apertures in the plates 29, secured to the bars 9, the branches 28 being held in place by the set-screws 30, whereby the bar 27 may be adjustably secured at any desired height, the office of said rod or member 27 being to gently touch the tops of the growing plants and turn the leaves sufficient to insure that the under sides thereof will be exposed to the dust or spray falling from one or more receptacles. By this arrangement it is possible to reach every portion of the leaf, and thus destroy the harmful insects and diseases, as will be clearly understood. It will be understood that this rod can extend either under a portion of the compartments, as shown in Fig. 1, or under all of them. In some instances both the inner and outer ends of the closures 21 may be left open, thus enabling the closures to be moved over the receptacles 16 and held thereon by frictional engagement, the said closures being moved nearer or farther apart, as desired.

For some plants of special size it may be desirable to have the rotating dust-receptacles divided into two or more compartments by the required number of thin disk-like partition-walls, thereby enabling the middle compartment only to be used, as upon small plants, and leaving the outer compartments empty for the time being, so that when the plants are of large growth the said outer receptacles may then be brought into use, it being understood that one, two, or more of the compartments may be used as may be required to properly cover the foliage of the plants from time to time during the different periods of their growth.

It will be understood that a suitable seat 24 may also be provided, as upon the standard 25, the latter being supported by the cross-bar or platform 26 or equivalent thereof.

The various parts of my invention may be cheaply and expeditiously manufactured and each readily assembled in its respective operative position, and, while I have described the preferred combination and construction of parts, I desire to comprehend in this application all substantial equivalents and substitutes that may be considered as fairly falling within the scope of my invention.

Having thus fully described my invention, what I claim as new, and desire to secure by Letters Patent, is—

1. The herein-described dust-distributing machine, comprising suitable carrying-wheels, and a supporting-axle; a frame mounted on said axle; standards carried by said frame; auxiliary members 9 extending into adjustable engagement with said standards; a shaft rotatably mounted on the rear ends of said members; suitable means to drive said shaft and a plurality of dust-holding receptacles carried by said shaft and adapted to rotate therewith, said receptacles having a perforated peripheral face, in combination with closures adapted to fit over the dust-receptacles or telescope therewith whereby said closures may be adjusted in place to limit the discharge of dust from the receptacles and suitable means to turn the leaves or tops of the plants that the lower side thereof will be exposed to the falling dust or spray, all combined substantially as specified and for the purpose set forth.

2. A machine of the character described comprising a rotatable shaft, a support therefor, apertured receptacles adjustably mounted upon the shaft, closures slidably mounted upon the receptacles, and means for securing said closures to the shaft, as set forth.

3. A machine of the character described, comprising a rotatable shaft, a support therefor, apertured receptacles adjustably secured upon the shaft, adjustable closures upon the receptacles, means for securing them to the shaft and against longitudinal movement, and means upon the support for depressing plants prior to the passage of the receptacles thereover, as set forth.

4. In a machine of the character described, a distributer comprising a rotatable apertured receptacle, having an inlet, oppositely-disposed closures slidably mounted upon the receptacle for covering the dust-apertures, a shaft extending through the receptacle and means for securing the closures to the shaft, as set forth.

In testimony whereof I have signed my name to this specification in the presence of two subscribing witnesses.

ARTHUR J. COLLINS.

Witnesses:
   JOHN T. EVANS,
   RALPH B. BURKE.